(12) United States Patent
Cline et al.

(10) Patent No.: US 12,425,438 B1
(45) Date of Patent: Sep. 23, 2025

(54) THREAT ACTIVITY STATISTICAL ANALYSIS DRIVEN ADAPTATION OF A CONTROL SPECIFICATION

(71) Applicant: Hitrust Services Corp., Frisco, TX (US)

(72) Inventors: Bryan Cline, Frisco, TX (US); Jeremy Huval, Celina, TX (US); Andrew Russell, Plano, TX (US)

(73) Assignee: HITRUST Services Corp., Frisco, TX (US)

( * ) Notice: Subject to any disclaimer, the term of this patent is extended or adjusted under 35 U.S.C. 154(b) by 285 days.

(21) Appl. No.: 18/137,719

(22) Filed: Apr. 21, 2023

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC .................. H04L 63/1433; H04L 63/1425
See application file for complete search history.

(56) References Cited

U.S. PATENT DOCUMENTS

| 10,778,703 | B2* | 9/2020 | Muddu | G06F 40/134 |
| 2008/0115221 | A1* | 5/2008 | Yun | G06F 21/552 726/25 |
| 2015/0180891 | A1* | 6/2015 | Seward | H04L 63/1416 726/22 |
| 2017/0091462 | A1* | 3/2017 | Kurauchi | H04L 63/1433 |
| 2018/0039922 | A1* | 2/2018 | King-Wilson | H04L 63/0263 |
| 2020/0314141 | A1* | 10/2020 | Vajipayajula | H04L 63/145 |
| 2021/0224385 | A1* | 7/2021 | Ross | G06F 21/577 |
| 2021/0360015 | A1* | 11/2021 | Mammadli | H04L 63/1466 |
| 2022/0006818 | A1* | 1/2022 | Cunningham | H04L 63/205 |
| 2023/0344860 | A1* | 10/2023 | Agranonik | G06N 3/08 |
| 2024/0223596 | A1* | 7/2024 | Sellars | H04L 63/1433 |

FOREIGN PATENT DOCUMENTS

| CN | 111131285 A | * | 5/2020 | .......... H04L 61/1511 |
| CN | 112543201 A | * | 3/2021 | .......... H04L 63/1425 |
| CN | 116155548 A | * | 5/2023 | ............. G06F 16/36 |
| CN | 117938698 A | * | 4/2024 | |
| CN | 118264481 A | * | 6/2024 | |

(Continued)

*Primary Examiner* — Sarah Su
(74) *Attorney, Agent, or Firm* — CRGO Global; Steven M. Greenberg

(57) ABSTRACT

Threat activity statistical analysis driven adaptive control specification includes retrieving a data structure from over a computer communications network into memory of a computing device and parsing the data structure in the memory to extract a listing of different threat activities. Threat activity statistical analysis driven adaptive control specification also includes computing in the memory a statistical analysis of the different threat activities. Finally, threat activity statistical analysis driven adaptive control specification includes responding to the statistical analysis surpassing a threshold for an identified one of the different threat activities by determining a corresponding threat incorporating the identified one of the different threat activities in an associated kill chain, retrieving a control specification addressing the corresponding threat, and modifying the control specification to address changes in the corresponding threat.

12 Claims, 4 Drawing Sheets

(56) References Cited

FOREIGN PATENT DOCUMENTS

| | | | | |
|---|---|---|---|---|
| CN | 118573594 | A * | 8/2024 | |
| CN | 118972163 | A * | 11/2024 | |
| CN | 119172110 | A * | 12/2024 | |
| CN | 119232497 | A * | 12/2024 | ......... H04L 63/1416 |
| GB | 2628924 | A * | 10/2024 | ............. G06F 21/55 |
| KR | 100942456 | B1 * | 2/2010 | |
| WO | WO-2010136787 | A1 * | 12/2010 | ........... G06F 21/577 |
| WO | WO-2020249572 | A1 * | 12/2020 | ............. G06F 21/51 |
| WO | WO-2022023671 | A1 * | 2/2022 | ........... G06F 21/577 |

* cited by examiner

THREAT ACTIVITY STATISTICAL ANALYSIS DRIVEN ADAPTATION OF A CONTROL SPECIFICATION

BACKGROUND OF THE INVENTION

Field of the Invention

The present invention relates to the technical field of organizational risk assessment for cybersecurity threats and more particularly to the adaptation of a control framework and the specification of control requirements from the control framework in the face of a changing threat landscape.

Description of the Related Art

Organizational risk remains part and parcel of the general operation of an organization. Organizational risk comes in many forms and generally maps a particular threat to an impact of the threat should the threat materialize. Threats in general refer to any prospective adverse event impacting the operation of the organization and is most often thought of in terms of a cost of the materialization of the threat as compared to the cost to avoid the materialization of the threat. In respect to cybersecurity, generally the threats are viewed in terms of both malicious and inadvertent breaches of the integrity of the computing infrastructure of an organization and the data managed thereon.

It is the controls implemented by the organization that are intended to avoid the materialization of such threats, the controls generally referring to internal protocols for avoiding the materialization of the threats, such as good operational policy for the members of the organization, and also tools and devices deployed within the computing infrastructure of the organization designed to either avoid the materialization of a threat, or to lessen or cure the impact of the materialization of the threat. Naturally, there is some indirect cost to implementing controls in the form of organizational policies including the necessary allocation of human resources, which can translate directly into a budgetable cost to the organization. As well, there is a direct cost to acquiring and deploying devices and computer programs into the computing infrastructure so as to achieve those types of controls necessary to avoid the materialization of a threat or the realization of the impact resulting from the materialization of a threat.

The controls of an assessment for which an assurance is determined are selected based upon a perceived risk of one or more threats transpiring at the organization. In many instances, the perceived risk directly correlates to the observation of occurrence of the activities of a threat as those activities become known to the organization. It is not reasonable, though, to presume that the frequency of occurrence of threat activities in the kill chains of different threats remains static. Rather, it is widely understood that certain threat activities occur more frequently or less frequently over time. Consequently, the assessment of the ability of an organization to insulate itself from certain threats, and the corresponding assurance of the validity of the assessment, can become stale over time.

BRIEF SUMMARY OF THE INVENTION

Embodiments of the present invention address technical deficiencies of the art in respect to the adaptation of control specifications for combatting different malicious threats to a data processing organization. To that end, embodiments of the present invention provide for a novel and non-obvious method for threat activity statistical analysis driven adaptive control specification. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, a method for threat activity statistical analysis driven adaptive control specification includes the retrieval of a data structure from over a computer communications network into memory of a computing device and the parsing of the data structure in the memory in order to extract a listing of different threat activities. Thereafter, a statistical analysis is computed in the memory of the different threat activities. Finally, in response to the statistical analysis having surpassed a threshold for an identified threat activity, one or more different corresponding threats which include the threat activity within a threat kill chain thereof are determined, a control specification is retrieved which addresses the different corresponding threats of the identified threat activity, and the control specification is modified to address the prominence of the identified threat activity implicated by the statistical analysis. Alternatively, to the extent that no modification to the control specification is readily determinable, a flag is set indicating a requirement for manual intervention.

In one non-limiting aspect of the embodiment the statistical analysis is a frequency distribution. In this regard, the threshold can be a threshold frequency of occurrence of the identified one of the different threat activities. Alternatively, the statistical analysis is an extrapolation of frequency at a future moment in time based upon a set of previously computed frequencies at previous moments, so as to indicate a trend. In that instance, the threshold is a threshold frequency of occurrence of the identified one of the different threat activities at the future moment in time.

In another aspect of the embodiment, the modification to the control specification is an addition of a new control. Alternatively, the modification to the control specification is a removal of an existing control. As yet another alternative, the modification to the control specification is a change to a parameter of an existing control. In all instances, a threat modeler may be employed to select multiple different controls which individually uniquely address the identified threat activity, such that the selection of one of the multiple different controls corresponds to a known scope and efficiency of the selected one of the multiple different controls relative to the known scope and efficiency of the others of the multiple different controls. To that end, each of the controls includes a mapping to one or more threat activities to which the control pertains. As well, each of the controls includes an assigned function or purpose indicating how the control interacts with a mapped one of the threat activities. As such, the threat modeler in response to the specification of a particular threat activity, can select a mapped one of the controls, or in response to the need to apply a specific function to a selected threat activity, can select an associated one of the controls.

In another embodiment of the invention, a data processing system is adapted for threat activity statistical analysis driven adaptive control specification. The system includes a host computing platform with one or more computers, each having memory and one or more processing units including one or more processing cores. The system also includes a control specification module. The module includes computer program instructions enabled while executing in the memory of at least one of the processing units of the host computing platform to retrieve a data structure from over a computer communications network into the memory of the host computing platform, to parse the data structure in the memory to extract a listing of different threat activities, to compute in the memory by the one or more processing units a statistical analysis of the different threat activities and to respond to the statistical analysis surpassing a threshold for an identified one of the different threat activities by determining a corresponding threat incorporating the identified one of the different threat activities in an associated kill chain, retrieving a control specification addressing the corresponding threat, and modifying the control specification to address the corresponding threat.

In this way, the technical deficiencies of the mere static formulation of a control framework specification of one or more control requirements based upon a one-time observation of threat activity occurrences are overcome owing to the adaptation of the controls of the assessment in response to a statistical analysis performed upon a threat data structure from which changes in observed occurrences for certain threat activities are determined. Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
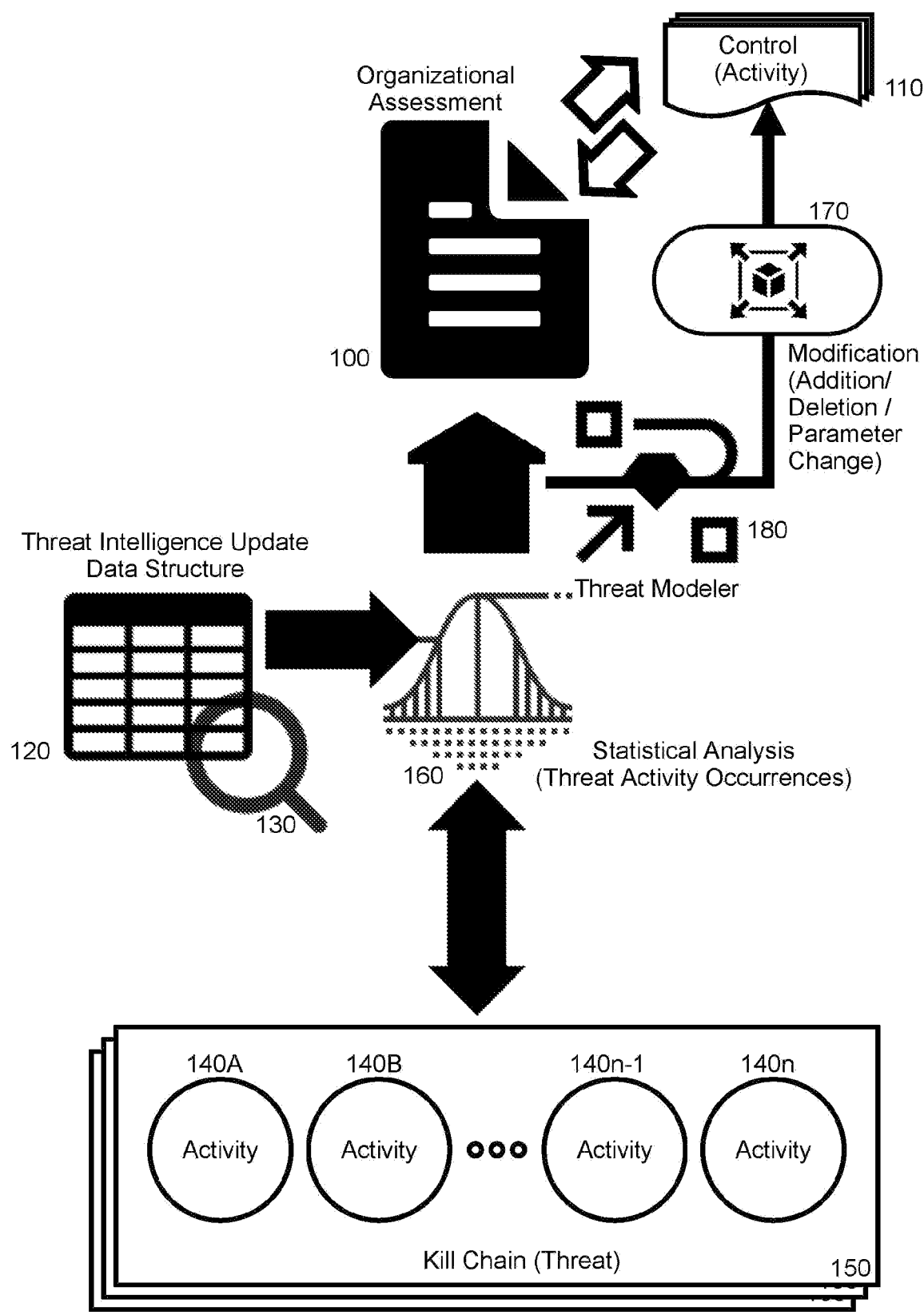
FIG. 1 is a pictorial illustration reflecting different aspects of a process of threat activity statistical analysis driven adaptive control specification.

Embodiments of the invention provide for threat activity statistical analysis driven adaptive control specification. In accordance with an embodiment of the invention, different controls are specified to address different threat activities constituting the different threat kill chains for different threats, and documented with an assurance document assuring sufficient controls in a control specification in order to address contemporaneously anticipated threats. Thereafter, periodically, a data structure is received from over a computer communications network enumerating different observed threat activities associated with one or more different threats. A statistical analysis is then conducted upon the enumerated activities of the data structure including a computation of a frequency of observation of the different threat activities. In this regard, the statistical analysis can be as simple as a frequency of observation within a set period of time of the different threat activities. As well, the statistical analysis can be a more complex analysis of a rate of change of observation of a frequency of observation over a set period of time of the different threat activities, or even an extrapolation of a predicted frequency of observation of a particular one of the threat activities at a future time based upon observed trends in frequency of observation of the particular one of the threat activities over a past to contemporaneous period of time.

In response to the statistical analysis indicating a notorious frequency of observation of one or more of the threat activities, in the context of a threat kill chain and other aspects of an overarching threat model, one or more of the controls of the assessment addressing the one or more of the threat activities can be modified. In this regard, the one or more controls may be modified in response to a determination that a number of potential successful occurrences of the one or more threat activities exceeds a threshold permissible number of successful occurrences defined as the observed number of occurrences of the one or more threat activities reduced by a probability of mitigation of the one or more threat activities resulting from the one or more controls addressing the one or more threat activities.

The modification can include, for instance, a change in one of more of the parameters of the one or more controls, by adding a new control, or by removing a control to the extent that the threshold change is a reduction in observation of the one of the threat activities. In a more complex embodiment, a flag or change value can be determined as a function of the statistical significance of observed changes in frequency of occurrence and a rules set based on (1) associated characteristics of the threat such as threat type, tactic, technique, and position in a threat kill chain, or any combination thereof, and (2) characteristics of controls such as control function, control efficacy, inclusion in a specific assessment type, and the existence of other controls related to the threat in the assessment(s), or any combination thereof.

In illustration of one aspect of the embodiment, FIG. 1 pictorially shows a process of threat activity statistical analysis driven adaptive control specification. As shown in FIG. 1, a control specification for an organizational assessment 100 specifies different prospective threats 150 to the computing infrastructure of an associated organization determined by the assurances required for the assessment 100. Each of the prospective threats 150 implicates a kill chain of one or more threat activities 140A, 140B, 140n-1, 140n. Further, each of the activities 140A, 140B, 140n-1, 140n includes meta-information that indicates a probability of success of a corresponding one of the activities 140A, 140B, 140n-1, 140n.

In association with each of the prospective threats 150, the organizational assessment maps a corresponding set of one or more controls 110. More specifically, each of the controls 110 combats at least one of the threat activities 140A, 140B, 140n-1, 140n in the kill chain of one or more of the threats 150. To that end, each of the controls 110 includes meta-information indicating a probability of successfully mitigating a threshold number of occurrences of a corresponding one of the threat activities 140A, 140B, 140n-1, 140n.

A threat intelligence update data structure 120 is received periodically and includes a listing of observed ones of the threat activities 140A, 140B, 140n-1, 140n. The threat intelligence update data structure 120 is subjected to an analyzer 130 in order to produce a statistical analysis 160 of the observed ones of the threat activities 140A, 140B, 140n-1, 140n included in the threat intelligence update data structure 120. The statistical analysis 160 includes, for instance, a frequency distribution of the observed ones of the threat activities 140A, 140B, 140n-1, 140n, or in a more complex aspect of the embodiment, a rate of change of the frequency distribution of the observed ones of the threat activities 140A, 140B, 140n-1, 140n based upon a previously computed statistical analysis (not shown) from a previously received threat intelligence update data structure (not shown).

To the extent that the statistical analysis 160 indicates a threshold change in the observation of one of the threat activities 140A, 140B, 140n-1, 140n, a threat modeler 180 selects a control set modification 170 for those of the controls 110 specifically mapped to the one of the threat activities 140A, 140B, 140n-1, 140n. For instance, the threat modeler 180 can retrieve the control set modification 170 as mapped to the one of the threat activities 140A, 140B, 140n-1, 140n as an enhancement over an existing set of the controls 110 for the one of the threat activities 140A, 140B, 140n-1, 140n. The retrieved control set modification 170 can include a change to one or more parameters of one or more corresponding ones of the controls 110 specifically mapped to the one of the threat activities 140A, 140B, 140n-1, 140n, such as a parameter specifying an interval of time between an action, a required confidence in an action, or an enhanced set of data required to assuage computational logic such as a password length or complexity requirement. Other examples of the control set modification 170 include the addition of a new one of the controls 110 not previously present in the set of the controls 110 mapped to the one of the threat activities 140A, 140B, 140n-1, 140n, or the removal of an existing one of the controls 110 mapped to the one of the threat activities 140A, 140B, 140n-1, 140n.

Figure 2:
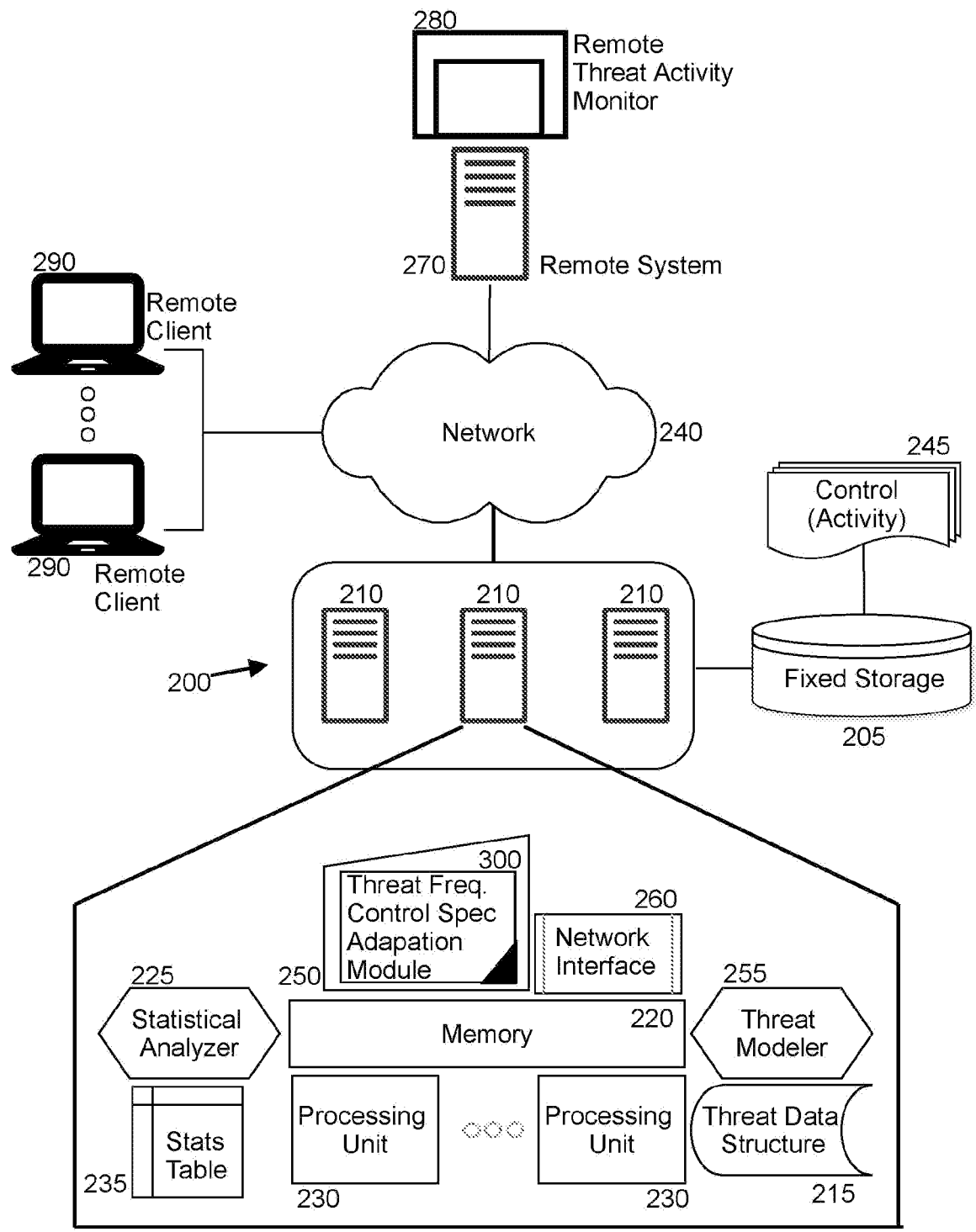
FIG. 2 is a block diagram depicting a data processing system adapted to perform one of the aspects of the process of FIG. 1.

Aspects of the process described in connection with FIG. 1 can be implemented within a data processing system. In further illustration, FIG. 2 schematically shows a data processing system adapted to perform threat activity statistical analysis driven adaptive control specification. In the data processing system illustrated in FIG. 1, a host computing platform 200 is provided. The host computing platform 200 includes one or more computers 210, each with memory 220 and one or more processing units 230. The computers 210 of the host computing platform (only a single computer shown in detail for the purpose of illustrative simplicity) can be co-located within one another and in communication with one another over a local area network, or over a data communications bus, or the computers can be remotely disposed from one another and in communication with one another through network interface 260 over a data communications network 240 and also in communication with one or more remote clients 290 from over the data communications network 240.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for threat activity statistical analysis driven adaptive control specification. Specifically, the program instructions during execution receive from a remote threat activity monitor 280 executing in remote computing system 270 from over the data communications network 240 into the memory 220 a threat data structure 215 including a listing of different observed threat activities.

The program instructions then invoke a statistical analyzer 225 to compute statistics within a statistics table 235 for the different observed threat activities. Those statistics in the statistics table 235 include, for instance, a frequency of observation of each of the different observed threat activities, or a rate of change of the frequency of observation of each of the different observed threat activities so as to show a threshold change in observation for each one of the observed threat activities over a period of time. In response to a threshold computation of the statistics in the statistics table 235 for one of the observed threat activities, the program instructions map the one of the observed threat activities to one or more controls 245 stored in fixed storage 205.

Subsequently, the program instructions invoke a threat modeler 255 of multiple different rules in the threat data structure 215, each of the rules determining whether or not a modification to the mapped one of the controls 245 is warranted based upon the probability of occurrence of a corresponding threat based upon the threshold change in observation, and the rules specifying one or more control set changes to the controls 245 resulting from the probability of the occurrence. Thereafter, the program instructions apply a modification to the controls 245 mapped to the one of the observed threat activities by the threat modeler 255.

Examples include changing a parameter of the mapped one of the controls 245, mapping a new one of the controls 245 to the one of the observed threat activities in order to provide greater assurance of the ability of the associated organization to properly protect against the one of the observed threat activities in light of an observed higher frequency of occurrence of the one of the observed threat activities, or the removal of an existing one of the controls 245 from mapping to the one of the observed threat activities in light of a lower observed frequency of occurrence of the one of the observed threat activities. Similar modifications can be triggered in light of a long-term change in frequency of the one of the observed threat activities. In this way, an assurance determination for an assessment of computing security for the organization can be dynamically reinforced through the adaptation of the control specification of the controls of the assessment responsive to the observation of the threat activities by the remote threat activity monitor 280.

Figure 3:
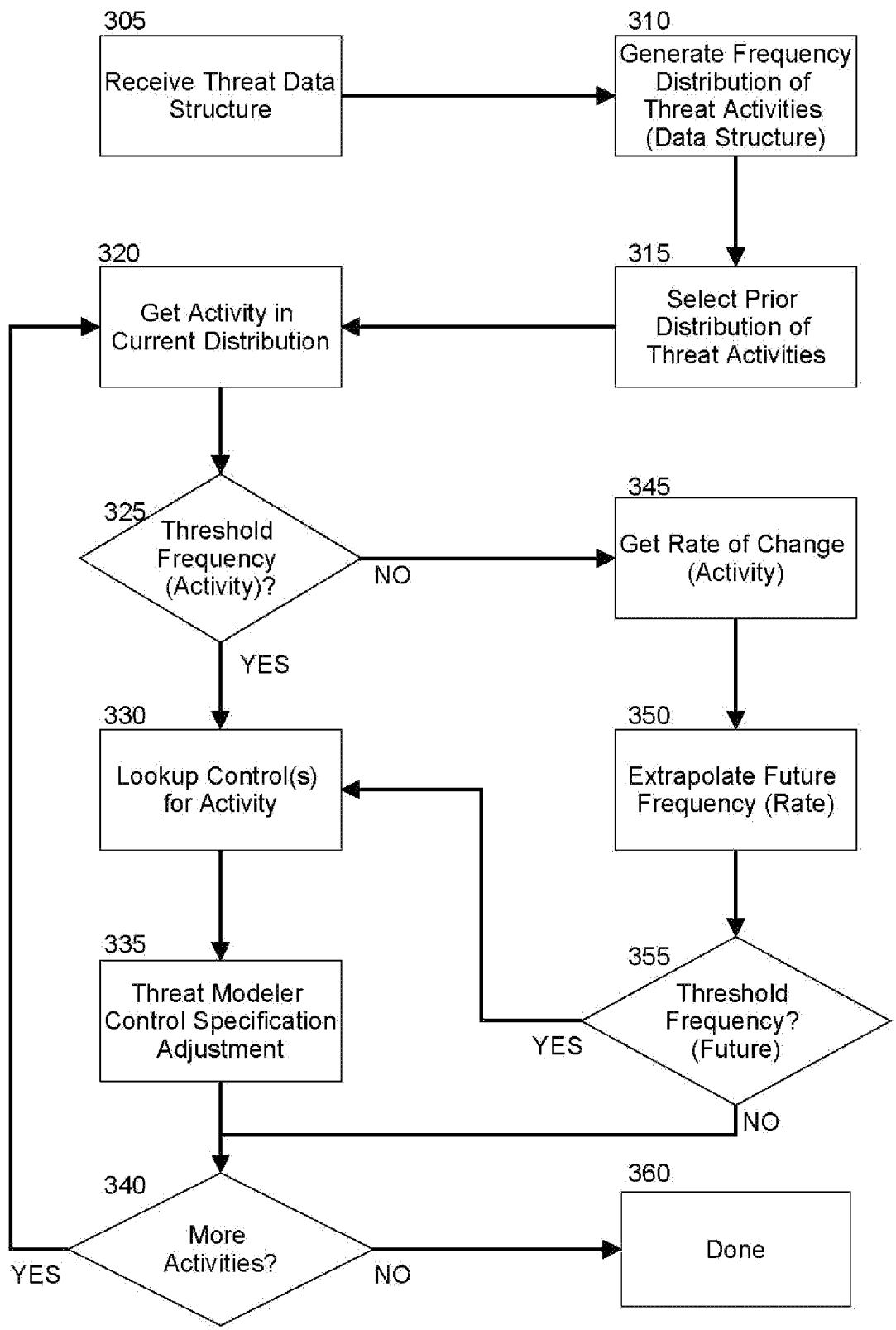
FIG. 3 is a flow chart illustrating one of the aspects of the process of FIG. 1; and, FIG. 4 is a flow chart illustrating a process for enhancing a control specification according to an observed threat activity by the threat modeler of FIG. 2.

In further illustration of an exemplary operation of the module, FIG. 3 is a flow chart illustrating one of the aspects of the process of FIG. 1. Beginning in block 305, a threat data structure is received into memory from over a data communications network. The threat data structure can range from a document to a table to a spreadsheet to a database. In block 310, a frequency distribution of observed threat activities is generated from the entries of observations of different threat activities in the data structure. Optionally, in block 315 a prior frequency distribution of observed threat activities can be selected for comparison with that generated for the received threat data structure.

In block 320, a first threat activity is selected in the current distribution received in memory and in decision block 325, it is determined whether or not a threshold statistical characterization based upon the observed frequency distribution is determined for the first threat activity. If so, in block 330, one or more controls mapped to the first threat activity are determined from a mapping and in block 335, a threat modeler is invoked to determine a specific adjustment to be applied to the control or controls, for instance based upon rules of the threat modeler mapping different statistical characterization values or ranges of observation of the threat activity to different controls or different control parameters.

Alternatively, if in decision block 325 it is not determined that a threshold statistical characterization has been observed for the first threat activity, in block 345, a rate of change of the threat activity over a period of time in comparison to the selected prior distribution is computed and in block 350, an expected frequency of observation of the threat activity is extrapolated from the computed rate of change at a future moment in time. As such, in decision block 355, if the expected frequency of observation of the threat activity at the future moment in time exceeds a threshold, in block 330, one or more controls mapped to the first threat activity are determined from a mapping and in block 335, the threat modeler specifies a specific adjustment to be applied to the control or controls. In either circumstance, in decision block 340, if additional threat activities remain to be analyzed in the current distribution, the process returns to block 320. Otherwise, the process ends in block 360.

Figure 4:
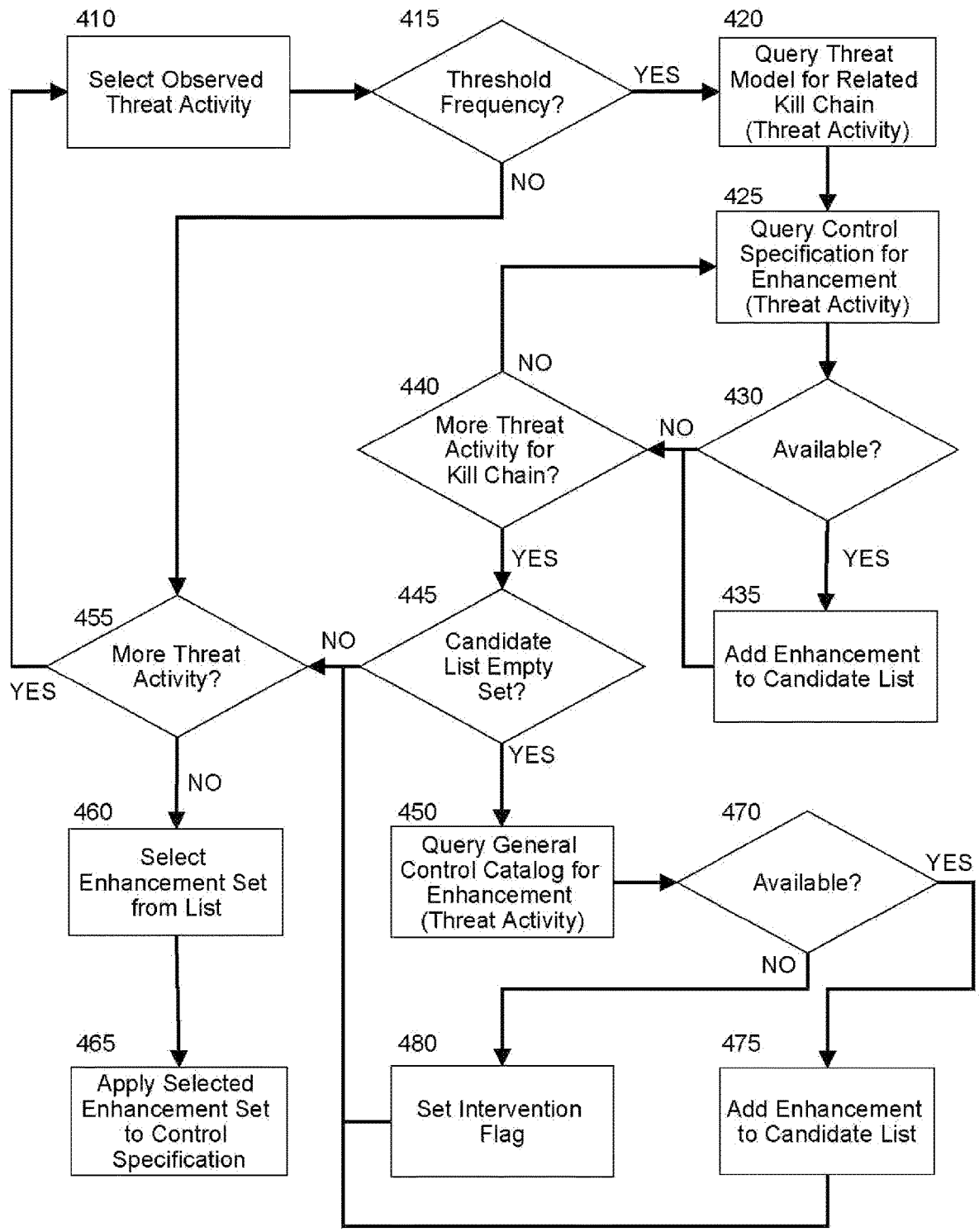

As can be seen, the threat modeler performs the important function of determining whether or not to apply one or more enhancements to a control specification in order to address a change in probability of a threat occurrence implicated by the observed statistical characterization of the threat activity. In more particular illustration, FIG. 4 is a flow chart illustrating a process for enhancing a control specification according to an observed threat activity by the threat modeler of FIG. 2 in the context of a single related threat kill chain for the purpose of simplicity.

Specifically, at block 410, an observed threat activity is selected for processing and, in decision block 415 it is determined whether or not the observed frequency of the threat activity exceeds a threshold. If not, in decision block 455 it is determined if additional threat activities have been observed and if so, the process repeats in block 410 with the selection of a new observed threat activity. In decision block 415, it is determined that the observed frequency of the threat activity exceeds a threshold, in block 420 a threat model is queried to identify a kill chain related to the threat activity. Subsequently, in block 425 a query executes against the control specification to determine if an enhancement can be made to the control specification to address the risk posed by the change in selected threat activity, for example, by reducing the likelihood the threat activity will successfully exploit a vulnerability.

To that end, in decision block 430, it is determined if an enhancement for the control specification is available from the control library. If so, the enhancement is added to a candidate list for analysis in block 435. If not, in decision block 440 it is determined if additional threat activities are associated with the kill chain and have not yet been processed. If so, the process returns to block 425 with the querying of the control specification to determine if an enhancement can be made to the control specification to address the risk posed by the change in the selected threat activity. But otherwise, in decision block 445, it is determined if at least one enhancement is present in the candidate list.

If not, in block 450, a query for an enhancement is transmitted to a general catalog of controls not tied to any specific underlying control specification. In decision block 470, if an enhancement is located within the general catalog responsive to the threat activity, in block 475 the enhancement is added to the candidate list. But otherwise, in block 480 an intervention flag is generated indicating to an analyst that a review is required of the threat activities and controls associated with the threat kill chain identified in block 420 to determine if new enhancements can be designed and added to the control library. In either circumstance, the process advances to decision block 455.

In decision block 455, it is determined if additional threat activities have yet to be processed. If so, the process repeats through block 410. However, if all threat activities have been processed, in block 460 one or more of the enhancements in the candidate list are selected for inclusion in the control specification. For instance, the enhancements can be selected according to meta-information specifying a probability of mitigation and a cost of implementation so that the selection of the enhancements can be optimized. As a final step, in block 465 the selected set of enhancements are added to the control specification.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for threat activity statistical analysis driven adaptive control specification comprising:
   retrieving a data structure from over a computer communications network into memory of a computing device;
   parsing the data structure in the memory to extract a listing of different threat activities;
   computing in the memory a statistical analysis of the different threat activities; and,
   responsive to the statistical analysis surpassing a threshold for an identified one of the different threat activities, determining a corresponding threat incorporating the identified one of the different threat activities in an associated kill chain, retrieving a control specification addressing the corresponding threat, and modifying the control specification to address the corresponding threat, wherein the statistical analysis is an extrapolation of frequency at a future moment based upon a set of previously computed frequencies at previous moments, and the threshold is a threshold frequency of occurrence of the identified one of the different threat activities at the future moment.

2. The method of claim 1, wherein the modification to the control specification is an addition of a new control.

3. The method of claim 1, wherein the modification to the control specification is a removal of an existing control.

4. The method of claim 1, wherein the modification to the control specification is a change to a parameter of an existing control.

5. A data processing system adapted for threat activity statistical analysis driven adaptive control specification, the system comprising:
   a host computing platform comprising one or more computers, each with memory and one or more processing units including one or more processing cores; and,
   a control specification module comprising computer program instructions enabled while executing in the memory of at least one of the processing units of the host computing platform to perform:
   retrieving a data structure from over a computer communications network into the memory of the host computing platform;
   parsing the data structure in the memory to extract a listing of different threat activities;
   computing in the memory by the one or more processing units a statistical analysis of the different threat activities; and,
   responsive to the statistical analysis surpassing a threshold for an identified one of the different threat activities, determining a corresponding threat incorporating the identified one of the different threat activities in an associated kill chain, retrieving a control specification addressing the corresponding threat, and modifying the control specification to address the corresponding threat, wherein the statistical analysis is an extrapolation of frequency at a future moment based upon a set of previously computed frequencies at previous moments, and the threshold is a threshold frequency of occurrence of the identified one of the different threat activities at the future moment.

6. The system of claim 5, wherein the modification to the control specification is an addition of a new control.

7. The system of claim 5, wherein the modification to the control specification is a removal of an existing control.

8. The system of claim 5, wherein the modification to the control specification is a change to a parameter of an existing control.

9. A computing device comprising a non-transitory computer readable storage medium having program instructions stored therein, the instructions being executable by at least one processing core of a processing unit to cause the processing unit to perform a method for threat activity statistical analysis driven adaptive control specification, the method including:
   retrieving a data structure from over a computer communications network into memory of a computing device;
   parsing the data structure in the memory to extract a listing of different threat activities;
   computing in the memory a statistical analysis of the different threat activities; and,
   responsive to the statistical analysis surpassing a threshold for an identified one of the different threat activities, determining a corresponding threat incorporating the identified one of the different threat activities in an associated kill chain, retrieving a control specification addressing the corresponding threat, and modifying the control specification to address the corresponding threat, wherein the statistical analysis is an extrapolation of frequency at a future moment based upon a set of previously computed frequencies at previous moments, and the threshold is a threshold frequency of occurrence of the identified one of the different threat activities at the future moment.

10. The device of claim 9, wherein the modification to the control specification is an addition of a new control.

11. The device of claim 9, wherein the modification to the control specification is a removal of an existing control.

12. The device of claim 9, wherein the modification to the control specification is a change to a parameter of an existing control.

* * * * *